US007056405B2

(12) United States Patent
Worden

(10) Patent No.: US 7,056,405 B2
(45) Date of Patent: Jun. 6, 2006

(54) HEAT SEALING APPARATUS AND METHOD

(75) Inventor: Ronald F. Worden, Maple Park, IL (US)

(73) Assignee: Alloyd Co., Inc., Dekalb, IL (US)

( * ) Notice: Subject to any disclaimer, the term of this patent is extended or adjusted under 35 U.S.C. 154(b) by 0 days.

(21) Appl. No.: 10/979,106

(22) Filed: Nov. 2, 2004

(65) Prior Publication Data

US 2006/0090841 A1 May 4, 2006

(51) Int. Cl.
*B32B 37/00* (2006.01)

(52) U.S. Cl. .................... 156/228; 156/580; 156/583.1

(58) Field of Classification Search ................ 156/538, 156/539, 556, 580, 581, 583.1, 64, 228; 264/319, 264/320

See application file for complete search history.

(56) References Cited

U.S. PATENT DOCUMENTS 4,310,376 A * 1/1982 Ebina et al. ................ 156/499
6,151,198 A * 11/2000 Prater et al. ............. 360/265.7
6,287,414 B1 * 9/2001 Green et al. ............. 156/583.1
6,413,334 B1 * 7/2002 Rittner et al. ................. 156/64
6,716,305 B1 * 4/2004 Green et al. ............. 156/583.1

* cited by examiner

*Primary Examiner*—James Sells
(74) *Attorney, Agent, or Firm*—Buchanan Ingersoll PC

(57) ABSTRACT

A blister packaging machine for packaging product includes a frame, a heater that is supported by the frame and movable with respect to the frame, a hydraulic clamp connected to the heater, an insulator is provided to adequately thermally insulate the hydraulic clamp from the heater, and a heat sealing member for contacting a heat sealable item during use. The heat sealing member is adapted to be connected to the heater by way of the hydraulic clamp. The heater and the heat sealing member are adapted to move so that the heat sealing member contacts the heat sealable item.

36 Claims, 6 Drawing Sheets

HEAT SEALING APPARATUS AND METHOD

FIELD OF THE INVENTION

This invention pertains to a heat sealing apparatus, and particularly, a heat sealing apparatus for heat sealing blister packages.

BACKGROUND OF THE INVENTION

In the discussion of the state of the art that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Blister packages are used to package a variety of different products. Blister packages typically comprise two pieces which are referred to as a blister on one side (e.g., a plastic carton often having a formed cavity to receive a product) and a card on the other side (e.g., a panel of plastic, cardboard, or other suitable material and which is often planar). Depending on the item to be sealed and the desired function of the package, e.g., multiple items separately contained in one blister seal or a single item in a single blister seal, or multiple differently shaped containers in a single blister seal, the blister packages are differently shaped.

During sealing of a blister package, the contents to be sealed are placed between the two pieces, and heat is applied to the blister package in a particular pattern, thereby sealing the blister to the card, thus sealing the contents inside the blister package. It is often necessary to apply a temperature of at least 300 degrees Fahrenheit to the blister packages to achieve a proper seal, and temperatures are sometimes required up to around 550 degrees Fahrenheit. This can be accomplished with an electrical resistance heater that is shaped so that it contacts and transfers heat to the blister packages in a particular pattern. However, for every different shaped blister package, the heater must be differently shaped to apply the proper pattern of heat to the blister package.

One option would be to maintain a number of differently shaped heaters to seal the different shaped blisters and to change the heater depending on the blister to be sealed. However, heaters are relatively costly and relatively burdensome to replace, therefore, changing a heater to correspond to different shaped blisters presents a number of issues.

Another solution is to use differently shaped heat sealing members that removably connect to the heater. The different heat sealing members each posses the particular shape required to transmit the heat from the heater to the blister package in the particular pattern necessary to seal the blister. When a different shaped blister package needs to be sealed, the heat sealing member is disconnected from the heater and a differently shaped heat sealing member is connected in its place.

A presently known system for changing heat sealing members includes manually operated clamping mechanisms that are normally of the "sheet metal" variety. A conventional clamping configuration is shown in FIGS. 4A and 4B, where a heating member 220 has a sheet metal member 600 positioned against the heater. The heater 220 has a receiving opening 320 and the sheet metal member 600 has an opening 610 adjacent to the receiving opening 320. The opening 610 has a narrow portion 615 and a wider circular portion 620. A heat sealing member 4 has a heat sealing plate 335 and a pole 700. The pole 700 extends from the heat sealing member 4 and has a narrow portion 720 between two wide portions 710, 730. During clamping, the user manually positions the heat sealing member 4 against the heater 220 so that the pole 700 extends through the receiving opening 320 and the wide portion 620 of the opening. To close the clamp, the sheet metal piece 600 is slid in the direction X, and the narrow portion 615 of the opening 610 is positioned around the narrow portion of the pole 720, thereby securing the heat sealing member against the heater 220.

One challenge associated with removably attached heat sealing members involves the clamping of the heat sealing member 4 to the heater 220. During clamping, the user lifts the heat sealing member 4 (which typically weighs about at least 20 lbs.) to a position below the heater 220. The user then lifts the heat sealing member 4 toward the heater 220 so that the poles 700 extend through the openings 320 in the heater 220 and through the openings 610 in the sheet metal clamping apparatus located adjacent to the heater 220. The user then manually slides the sheet metal clamp 600 in the direction X, positioning the narrow portion 720 of the pole 700 in the narrow portion of the opening 610, thereby securing the pole 700 and the heat sealing plate 335 against the heater 220. This operation is generally relatively challenging for the user.

Another issue associated with the conventional method of using heat sealing members involves unclamping and removing the heat sealing member after use. After use, the heat sealing member 4 is very hot for a significant period of time. Should the user not be able to wait for the heat sealing member 4 to adequately cool, the user is often presented with the task of unclamping the heat sealing member 4 while it is still extremely hot. To do this, the user normally wears thermally insulated protective gloves, and holds the heat sealing member 4 with one arm while releasing the clamps with the other arm. The user than removes the heat sealing member 4 from the heat sealing apparatus.

A further challenge associated with the conventional clamping mechanisms of the "sheet metal" variety is their tendency to deform over time, thereby allowing for a gap to be present between the heat sealing member 4 and the heater 220 which can create inefficient heat transfer between the heater 220 and the heat sealing member 4.

SUMMARY

One embodiment is generally directed to a blister packaging machine for packaging product, comprising, a frame, a heater that is supported by the frame and moveable with respect to the frame, a hydraulic clamp connected to the heater, an insulator provided to adequately thermally insulate the hydraulic clamp from the heater, a heat sealing member for contacting a heat sealable item during use, the heat sealing member being adapted to be connected to the heater by way of the hydraulic clamp, and whereby the heater and the heat sealing member are adapted to move so that the heat sealing member contacts the heat sealable item.

Another embodiment is generally directed to a heat sealing apparatus, comprising, a frame, a heater that is moveable with respect to the frame and is adapted to move toward a heat sealable item, thereby transmitting heat to the heat sealable item to seal the item, and a hydraulic clamp connected to the heater, the hydraulic clamp being adequately thermally insulated from the heater.

Another embodiment is generally directed to a method of attaching heat seal members to a heater in a heat seal apparatus for heat sealing a heat sealable package, the heat sealing apparatus comprising a frame, a heater that is supported by the frame and movable with respect to the frame, heat sealable items that are supported by the frame and are adapted to be positioned so that the heater can move toward and away from the support member, comprising, positioning a heat sealing member on the support member so that the heat sealing member is in a position whereby the heat sealing member may be connected to the heater by way of the hydraulic clamp, and actuating the hydraulic clamp thereby holding the heat sealing member against the heater.

BRIEF DESCRIPTION OF THE DRAWINGS

The following detailed description of embodiments can be read in connection with the accompanying drawings in which like numerals designate like elements and in which.

DETAILED DESCRIPTION OF PREFERRED EMBODIMENTS

Figure 1:
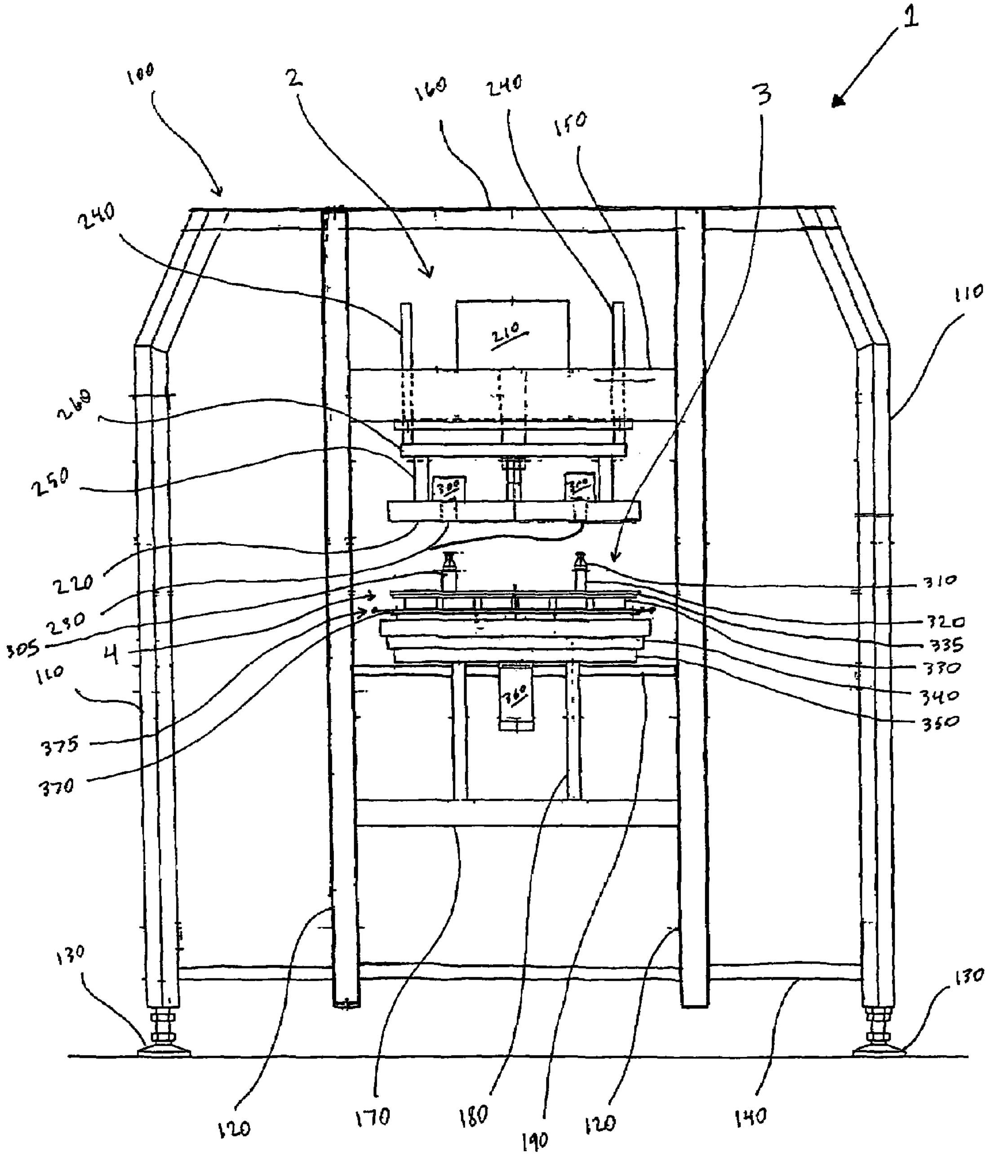
FIG. 1 shows an embodiment of the present invention.

An embodiment of a heat sealing apparatus according to the present invention is shown in FIG. 1. The heat sealing apparatus 1 includes a frame 100 having side members 110, top members 160, bottom members 140, and inner support members 120, 150, 170, 180, and 190. The frame is supported on a surface by feet 130.

A heat sealing press apparatus 2 and a heat sealing support apparatus 3 are supported within the frame 100.

The heat sealing press apparatus 2 includes a hydraulic cylinder 210 that is supported by the member 150. The hydraulic cylinder 210 acts on a pressing member 260, whose stability during movement is maintained by guide rods 240 that slidingly extend through the member 150. A heater 220 is supported on the pressing member 260 via vertical support members 250. The heater 220 has receiving openings 230 that extend through the heater 220. Pneumatic clamping mechanisms 300 are connected to the heater 220 in a position aligned with the receiving openings 230. An example of a pneumatic clamping mechanism 300 is the model 377 Shouldered Mini Cylinder Lock™ available from Edward D. Segen & Co, Inc. of 3 Schooner Lane, Suite 1-11, Milford, Conn. 06460 (www.segen-online.com).

The pneumatic clamping mechanism 300 is hydraulic by definition, and any hydraulic clamping mechanism can be used in place of the pneumatic clamping mechanism 300 described herein.

The heat sealing support apparatus 3 includes a hydraulic cylinder 360 connected to a member 350 that is supported by the members 170, 180, 190. A piston of the hydraulic cylinder 360 is connected to a movable support member 340 that raises and lowers with the piston. A heat sealing member 4 is supported prior to clamping, on a tray 370 on the member 340. As shown, the tray can have handles 375 thereby allowing the user to carry the tray 370 with little risk of contacting the heat sealing member 4 with their body. The heat sealing member 4 includes shaped protrusions 330 that are connected to a heat sealing plate 335. The shaped protrusions 330 conform to the particular blister to be sealed. One or more poles 305 extend from the sealing plate 335 upward toward the heater 220, and include a first length 320 and a second length 310 that is clamped by the pneumatic clamps 300.

A number of positions of the apparatus that can be realized during clamping of the heat sealing member 4 are sequentially shown in FIGS. 2A–2E.

Figure 2B:
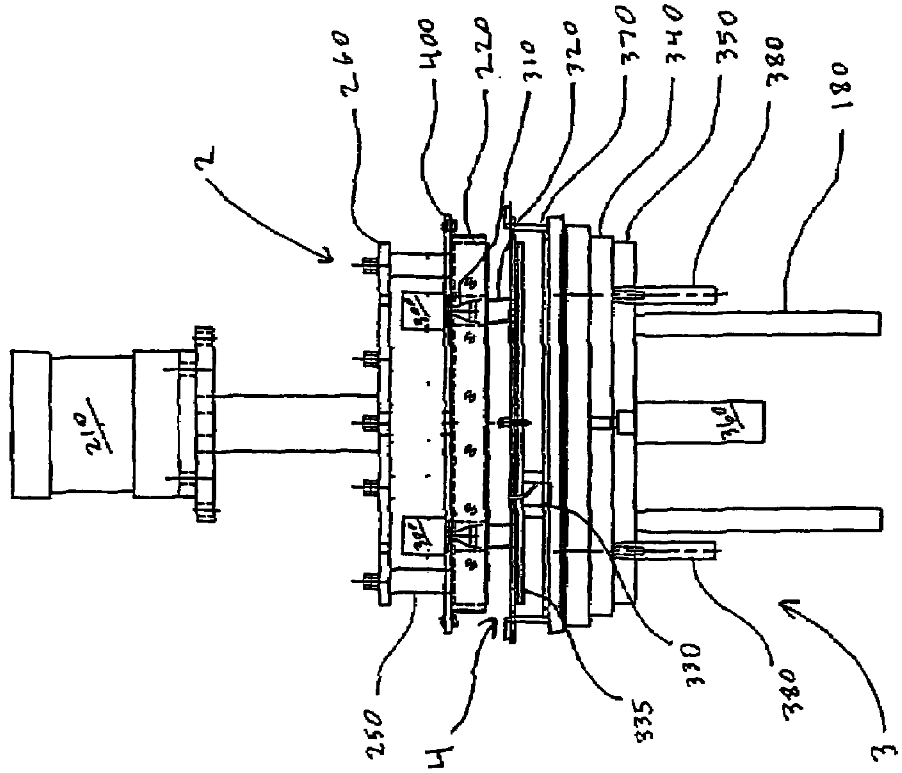
FIGS. 2A–2E show front views of a portion of an embodiment of the present invention in different operating positions.
Figure 2A:
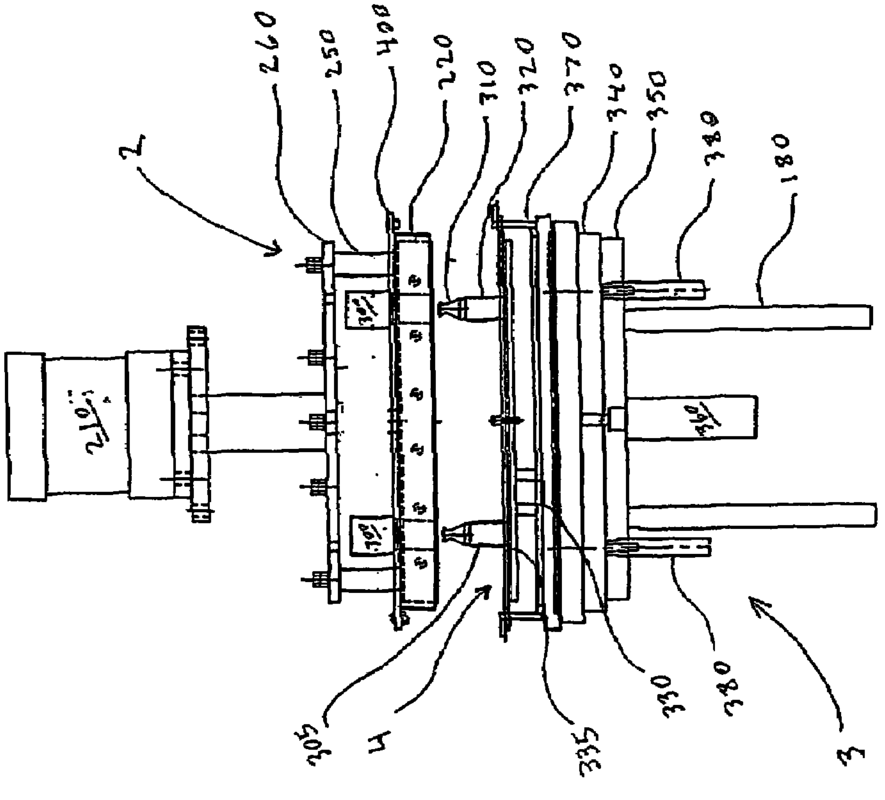

FIG. 2A shows the heat sealing press apparatus 2 when the hydraulic cylinder 210 is in a retracted position, and the heat sealing support apparatus 3 when the hydraulic cylinder 360 is retracted. The heat sealing member 4 is carried by a tray 370. The tray 370 and the heat sealing member 4 are supported by the support member 340. The tray 370 holding the heat sealing member 4 can be carried by the user and placed in the position shown in FIG. 2A.

In FIG. 2B, the hydraulic cylinder 210 is extended, and the heater 220 is lowered with respect to the position shown in FIG. 2A. In this position, the second lengths 310 of the poles 305 are inside the receiving openings 230 of the heater 220.

Figure 2D:
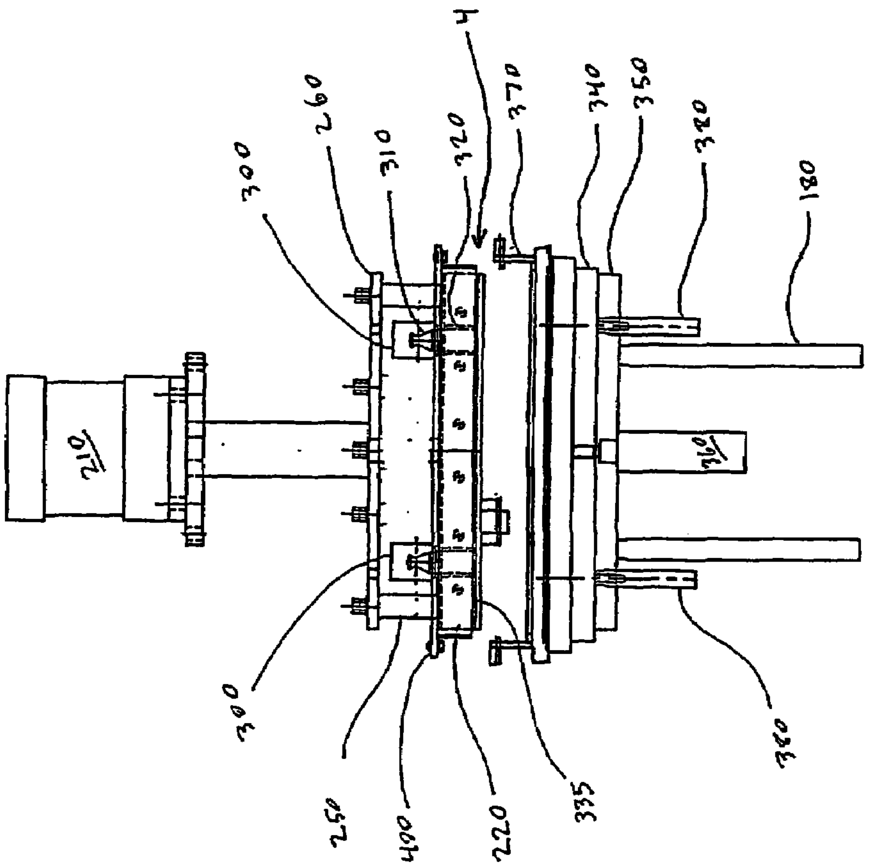
Figure 2C:
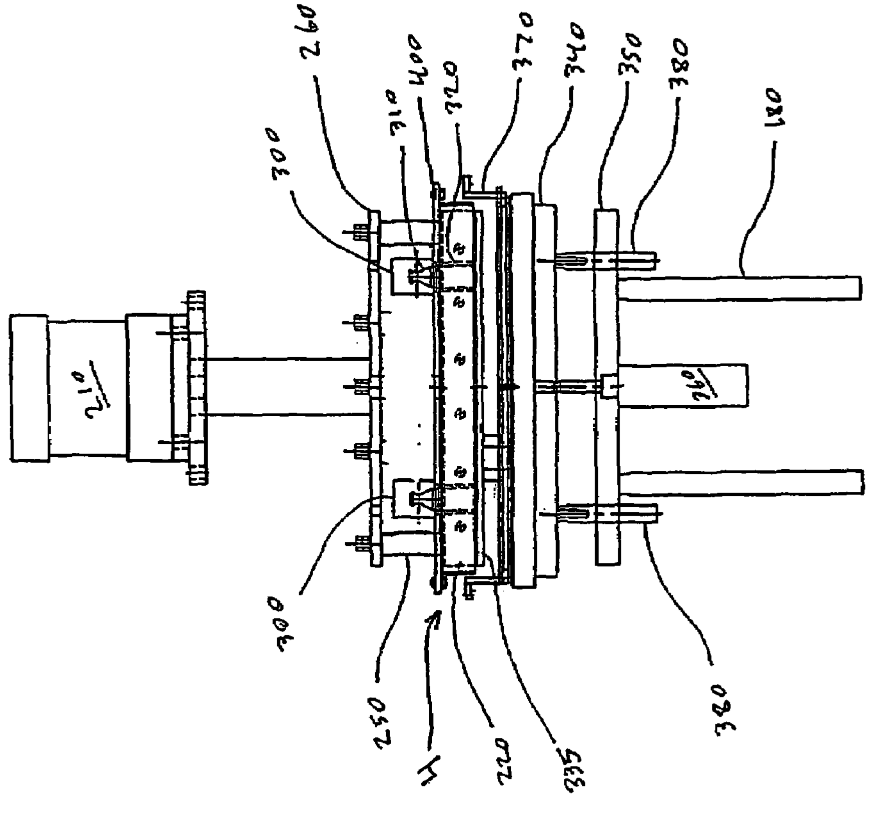

In FIG. 2C, the hydraulic cylinder 210 is in an extended position, and the hydraulic cylinder 360 is also in an extended position, thereby raising the support member 340 and the heat sealing member 4. The second lengths 310 of the poles 305 are inside the pneumatic clamps 300. Normally, when in this position, the pneumatic clamps 300 are actuated, thereby clamping the second lengths 310 of the poles 305 and holding the heat sealing plate 335 against the heater 220.

In FIG. 2D, the pneumatic clamps 300 are actuated and clamp the second lengths 310 of the poles 305. The hydraulic cylinder 360 is retracted, thereby lowering the support member 340 and the tray 370. The heat sealing plate 335 remains against the heater 220 as shown in FIG. 2C.

Figure 2E:
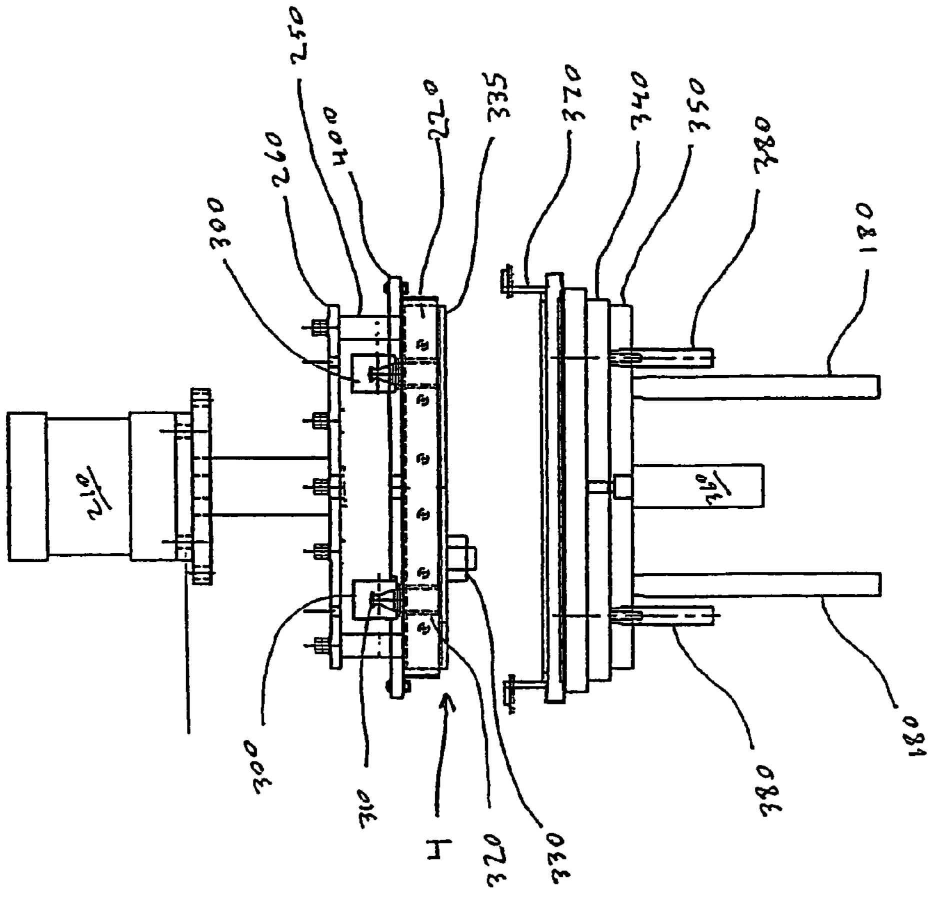

In FIG. 2E, the hydraulic cylinders 210 and 360 are both in a retracted position. The second lengths 310 of the poles 305 are clamped by the pneumatic clamps 300, thereby holding the heat sealing plate 335 against the heater 220, and the support member 340 and the tray 370 are lowered away from the heat sealing member 4. The tray 370 can be removed from this position by the user prior to heat sealing of packages.

The heat sealing member 4 can be unclamped in a manner opposite to that described above for clamping of the heat sealing member 4. To unclamp the heat sealing member 4, as shown in FIG. 2E, the user can place the tray 370 on the support member. As seen in FIGS. 2C and 2E, the hydraulic cylinders 210 and 360 can be extended so that the heat sealing member 4 is supported by the support member 340 and the tray 370 and the pneumatic clamps 300 can be released. As seen in FIGS. 2A and 2B, the hydraulic cylinders 210 and 360 can then be retracted and the user can remove the heat sealing member 4 by carrying the tray 370.

The heater generally operates at temperatures in the range of 300 degrees Fahrenheit to approximately 550 degrees Fahrenheit. Pneumatic clamps 300 include elastic seals that are involved in effecting a clamping force on the second length of the poles 320. These seals are typically rated for operation up to around a maximum of 400 degrees Fahrenheit, and under normal operating conditions of the described heat sealing apparatus would tend to melt or be otherwise negatively affected. Therefore, there is an issue pertaining to maintaining the pneumatic clamps at a temperature that is adequately lower than that realized by the heater 220 or the heat sealing member 4. This maintenance could be accomplished by insulating the pneumatic clamp 300 from the heater 220.

Figure 3A:
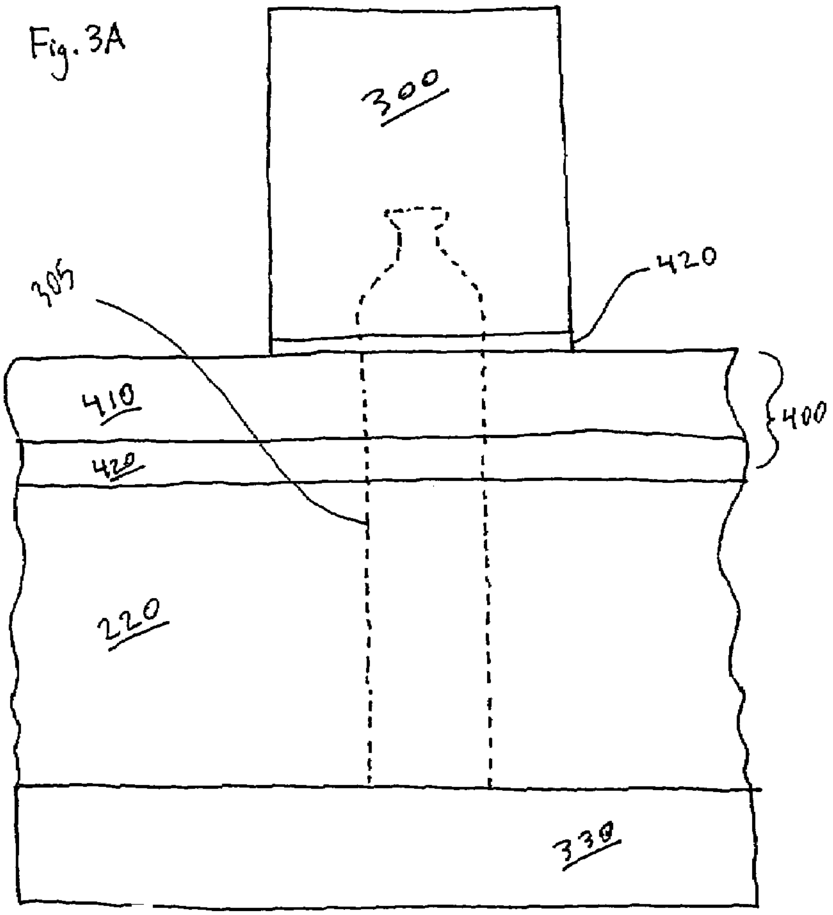
FIG. 3A shows a magnified view of a portion of the apparatus shown in FIG. 2B.

FIG. 3A shows an insulating member 400 that includes a rigid plate 410, in this case aluminum, and a layer of thermal insulation 420. The thermal insulation 420 should operate at temperatures at least as high as around 500 degrees Fahrenheit and have a heat flow rating of somewhere in the range of 0.25–0.75 (Btu·in.)/(hr·sq. ft.) at 500 degrees Fahrenheit. Preferably, the insulation can be a ceramic fiber blanket that is capable of continuously operating at temperatures as high as approximately 2300 degrees Fahrenheit. An example of thermal insulation is a Ceramic Fiber Strip, Part No. 87575K83 available from McMaster-Carr, Inc. (www.mcmaster.com). Other methods of thermally insulating the pneumatic clamp 300 can also be employed.

Figure 3B:
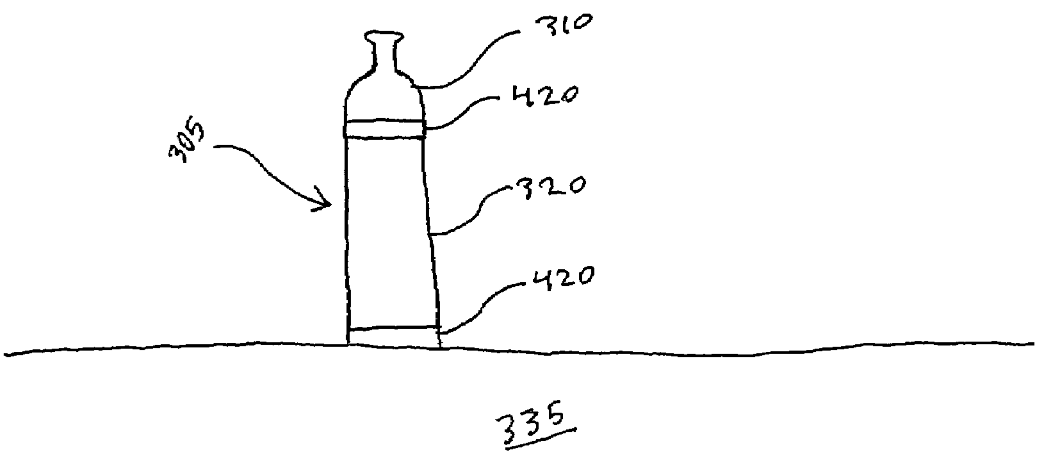
FIG. 3B shows a magnified view of a portion of the apparatus shown in FIG. 2A.
Figure 4A:
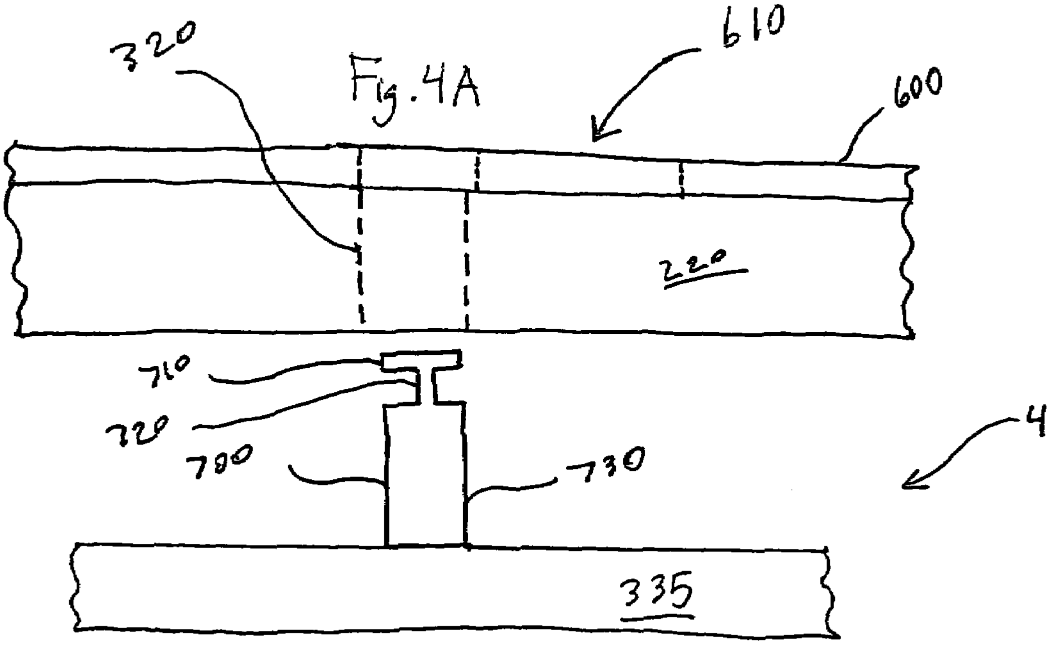
FIG. 4A shows a side view of a conventional clamping apparatus.
Figure 4B:
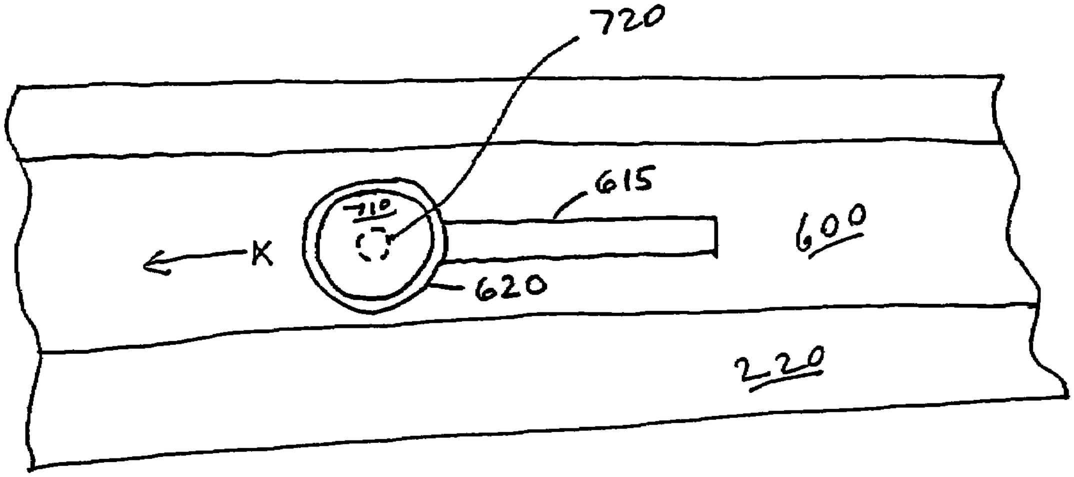
FIG. 4B shows a top view of the clamping apparatus shown in FIG. 4A.

In another embodiment shown in FIG. 3B, each pole 305 includes insulation layer 420, in this case a ceramic fiber layer, located between the second length 310 and the first length 320. Also, an insulation layer 420 can be located between the second length 320 and the heat sealing plate 335. This configuration prevents too much heat from transferring from the heater 220 through the first length 320 to the second length 310 to the pneumatic clamp 300.

Any combination of configurations of the insulation can be employed that adequately insulate the pneumatic clamp 300. For example, insulation can be placed between the pneumatic clamp 300 and the heater 220, between the heater 220 and the rigid member 410, between the first length 320 and the heat sealing plate 335, between the first length 320 and the second length 310, or any combination thereof.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A blister packaging machine for packaging product, comprising:
- a frame;
- a heater that is supported by the frame and movable with respect to the frame;
- a hydraulic clamping device connected to the heater,
- an insulator provided to thermally insulate the hydraulic clamping device from the heater to prevent damage to the hydraulic clamping device; and
- a heat sealing member for contacting a heat sealable item during use, the heat sealing member being adapted to be connected to the heater by way of the hydraulic clamping device;
- the hydraulic clamping device comprising a first part and a second part, where the first part is connected to the heater and the second part is connected to the heat sealing member, and wherein the hydraulic clamping device has a first position where the first part is separate from and not engaged with the second part, and a second position where the first part is engaged with the second part so as to clamp the first and second parts together, the clamping being actuated by a hydraulically created force; and
- whereby the heater and the heat sealing member are adapted to move so that the heat sealing member contacts the heat sealable item.

2. The blister packaging machine of claim 1, wherein the heat sealing member further comprises a pole and a heat sealing plate, the pole being connected to the heat sealing plate and comprising the second part.

3. The blister packaging machine of claim 2, wherein the pole comprises;
- a first length and a second length, the first length being connected between the heat sealing plate and the second length, the second length comprising the second part.

4. The blister packaging machine of claim 1, further comprising:
- a support member for supporting a heat sealable item, the support member being supported by the frame, movable with respect to the frame, and positioned so that the heater is movable toward and away from the support member, thereby allowing the heater and the heat sealing member to be moved toward and against the heat sealable item during operation of the blister packaging machine.

5. The blister packaging machine of claim 3, wherein the thermal insulator is positioned between the heater and the second length, thereby insulating the second length and the hydraulic clamping device when in use.

6. The blister packaging machine of claim 3, wherein the thermal insulator is positioned between the first length and the second length, thereby insulating the second length from the heat sealing member and the heater during use, and also insulating the first part of the hydraulic clamping device from the heat sealing member and the heater during use.

7. The blister packaging machine of claim 1, wherein a rigid member and a layer of thermal insulation is positioned between the first part of the hydraulic clamping device and the heater, thereby thermally insulating the hydraulic clamping device from the heater.

8. The blister packaging machine of claim 7, wherein the layer of thermal insulation comprises a ceramic fiber blanket.

9. The blister packaging machine of claim 1, further comprising a series of movable support members for supporting heat sealing members, the support members being alternately located in a position so that the first part of the hydraulic clamping device can clamp onto the second part of the hydraulic clamping device that is connected to a selected heat sealing member.

10. The heat sealing apparatus of claim 1, wherein the heater operates up to at least 350 degrees Fahrenheit.

11. The heat sealing apparatus of claim 1, wherein the heater operates up to at least 450 degrees Fahrenheit.

12. The heat sealing apparatus of claim 1, comprising at least two hydraulic clamping devices.

13. The heat sealing apparatus of claim 1, wherein the hydraulic clamping device is pneumatic.

14. A heat sealing apparatus, comprising:
- a frame;
- a heater that is moveable with respect to the frame and is adapted to move toward a heat sealable item, thereby transmitting heat to the heat sealable item to seal the item;
- a hydraulic clamping device comprising a first part and a second part, where the first part is connected to the heater and the second part is connected to a heat sealing member, and wherein the hydraulic clamping device has a first position where the first part is separate from and not engaged with the second part, and a second position where the first part is engaged with the second part so as to clamp the first and second parts together, the clamping being actuated by a hydraulically created force; and the second part of the hydraulic clamping device being thermally insulated from the heater;

wherein the second part of the hydraulic clamping device is adapted to releasably connect to the first part of the hydraulic clamping device.

15. The heat sealing apparatus of claim 14, wherein the hydraulic clamping device is pneumatic.

16. The heat sealing apparatus of claim 14, wherein the heat sealing member is shaped to contact and seal the heat sealable item, and the heat sealing member is adapted to be held against the heater by way of the hydraulic clamping device.

17. The heat sealing apparatus of claim 14, wherein an insulating member is positioned between the first part of the hydraulic clamping device and the heater, thereby thermally insulating the first part of the hydraulic clamping device from the heater.

18. The heat sealing apparatus of claim 14, wherein the thermal insulator comprises a ceramic fiber blanket.

19. The heat sealing apparatus of claim 14, wherein a rigid member and a layer of thermal insulation thermally insulate the first part of the hydraulic clamping device from the heater.

20. The heat sealing apparatus of claim 14, further comprising a support mechanism for supporting heat sealable items, the support mechanism being supported by the frame and positioned so that the heater is movable toward and away from the support member during operation of the heat sealing apparatus.

21. The heat sealing apparatus of claim 20, wherein the support member is adapted to support the heat sealing member prior to clamping of the second part of the hydraulic clamping device.

22. The heat sealing apparatus of claim 14, comprising at least two hydraulic clamping devices.

23. The heat sealing apparatus of claim 14, wherein the heater operates up to at least 350 degrees Fahrenheit.

24. The heat sealing apparatus of claim 14, wherein the heater operates up to at least 450 degrees Fahrenheit.

25. The heat sealing apparatus of claim 18, wherein the ceramic fiber blanket is capable of continuously operating at temperatures as high as approximately 2300 degrees Fahrenheit.

26. The blister packaging machine of claim 8, wherein the ceramic fiber blanket is capable of continuously operating at temperatures as high as approximately 2300 degrees Fahrenheit.

27. A method of attaching heat seal members to a heater in a heat seal apparatus for heat sealing a heat sealable package, the heat sealing apparatus comprising a frame, a heater that is supported by the frame and movable with respect to the frame, a hydraulic clamping device comprising a first part and a second part, where the first part is connected to the heater and the second part is connected to a heat sealing member, and wherein the hydraulic clamping device has a first position where the first part is separate from and not engaged with the second part, and a second position where the first part is engaged with the second part so as to clamp the first and second parts together, the clamping being actuated by a hydraulically created force, wherein the first part is supported by the heater, and heat sealable items that are supported by the frame and are adapted to be positioned so that the heater can move toward and away from the support member, comprising:

positioning a heat sealing member on the support member so that the heat sealing member is in a position whereby the heat sealing member may be connected to the heater by way of the second part of the hydraulic clamping device; and actuating the first part of the hydraulic clamping device thereby clamping the second part in the first part and holding the heat sealing member against the heater.

28. The method of claim 27, further comprising;

moving the support member and the heater closer to one another so that the second part of the hydraulic clamping device connected to the heat sealing member is in a position to be clamped by way of the first part of the hydraulic clamping device.

29. The method of claim 28, wherein, when the support member and the heater move toward one another, the heater does not move with respect to the frame.

30. The method of claim 28, wherein when the support member and the heater move toward one another, the support member and the sealing member do not move with respect to the frame.

31. The method of claim 27, further comprising moving the heater and the heat sealing member toward the support member, thereby contacting a heat sealable item, and moving the heater and the heat sealing member away from the support member.

32. The method of claim 27, further comprising; moving the support member carrying a heat sealable item toward the heater and the heat sealing member, thereby contacting the heat sealable item to the heat sealing member and sealing the heat sealable item, and moving the support member away from the heater and the heat sealing member.

33. The method of claim 27, further comprising; positioning the heat sealing member on the support member by carrying the heat sealing member in a tray and positioning the tray to be supported by the support member.

34. The blister packaging machine of claim 1, wherein in the second position the second part is clamped by the first part so as to be held within the first part.

35. The heat sealing apparatus of claim 14, wherein in the second position the second part is clamped by the first part so as to be held within the first part.

36. The method of claim 27, wherein in the second position the second part is clamped by the first part so as to be held within the first part.

* * * * *